United States Patent Office 3,466,535
Patented Sept. 9, 1969

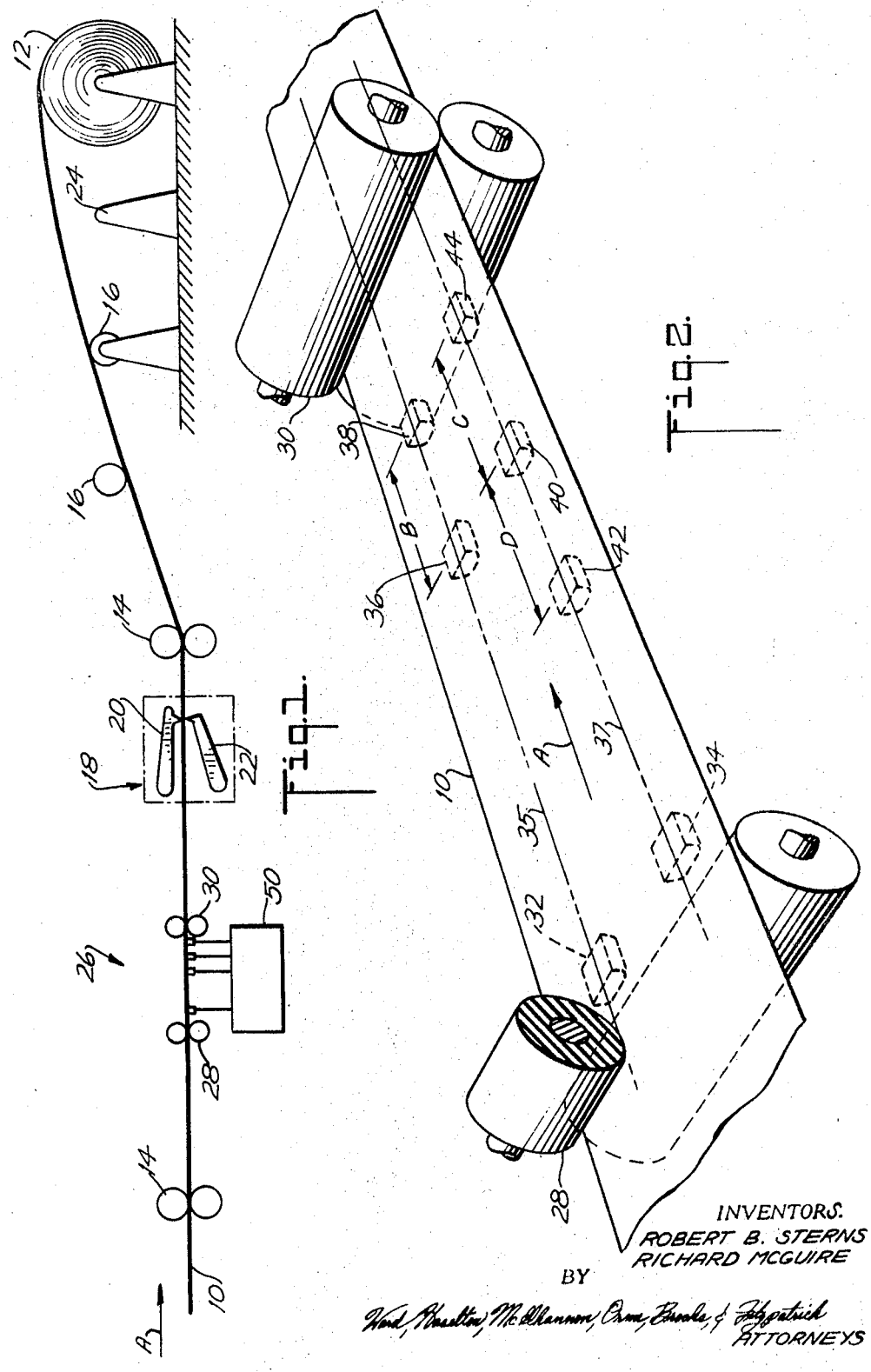

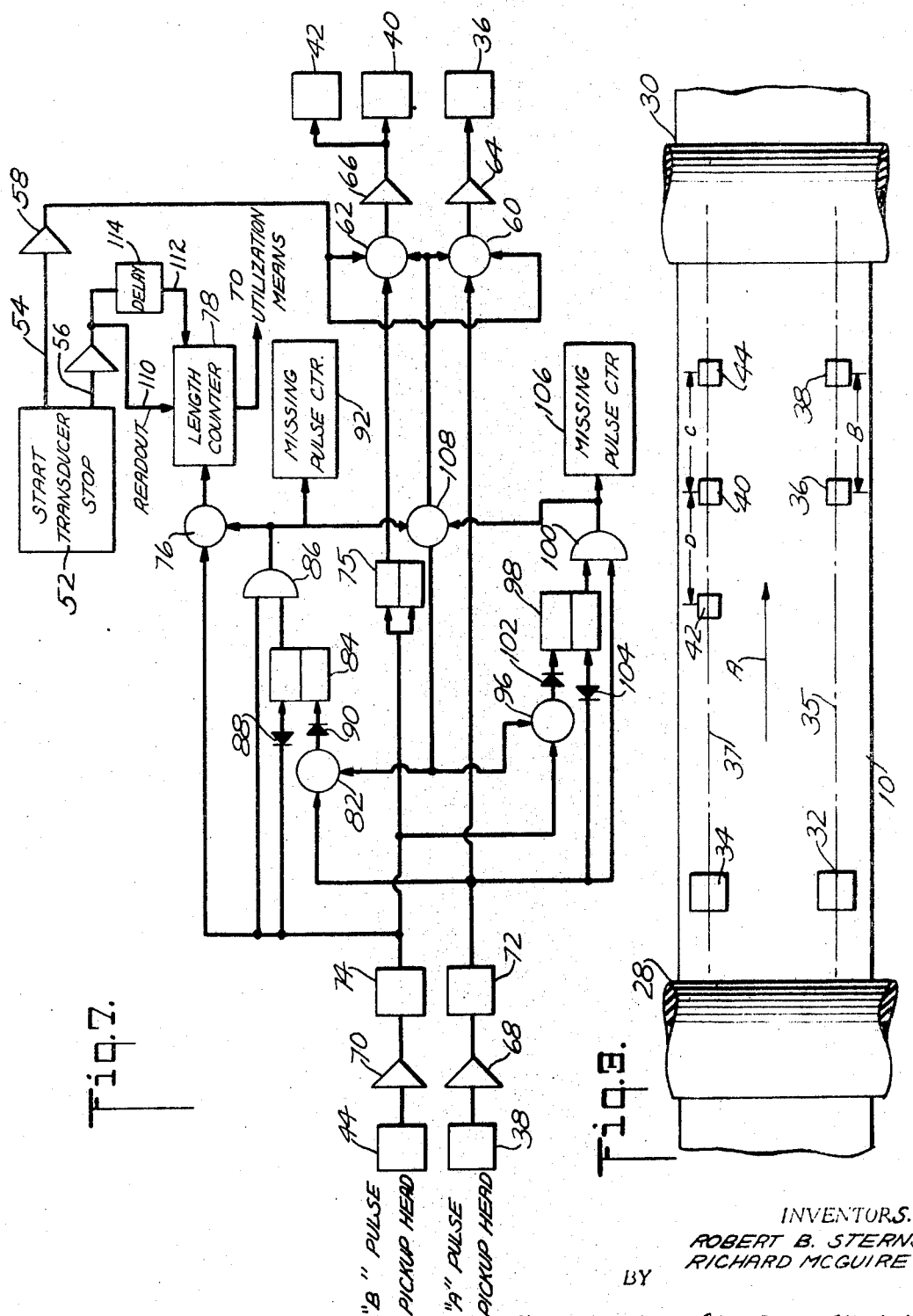

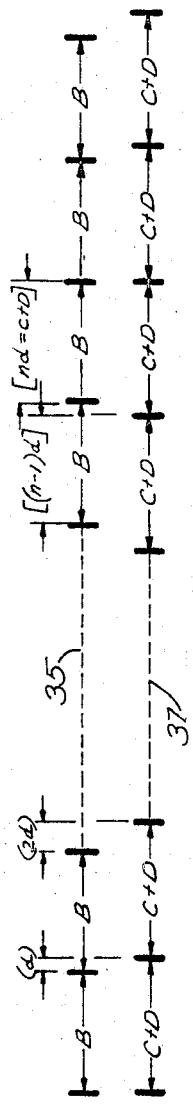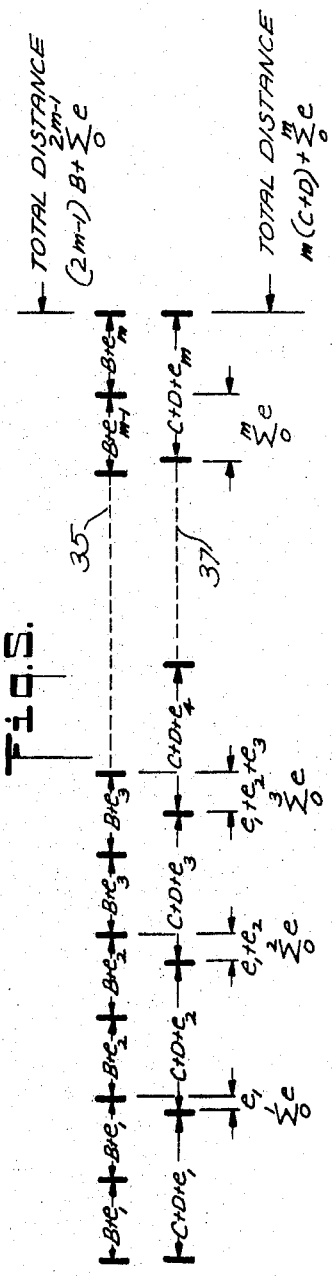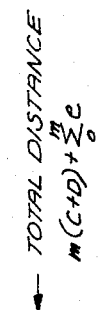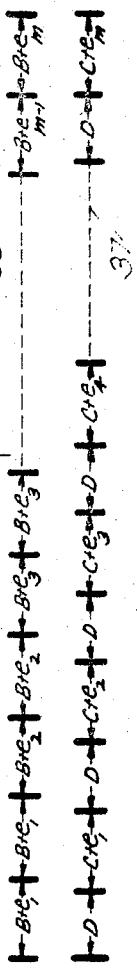

3,466,535
METHOD AND APPARATUS FOR MAKING MEASUREMENTS ALONG SURFACES
Robert B. Sterns, Great Neck, and Richard McGuire, Smithtown, N.Y., assignors to Logic Systems, Inc., Great Neck, N.Y., a corporation of New York
Filed Dec. 13, 1966, Ser. No. 601,413
Int. Cl. B23q *17/00;* G06f *7/385;* G11b *5/48*
U.S. Cl. 324—34                                            24 Claims

ABSTRACT OF THE DISCLOSURE

Two sets of marker and mark detecting means arranged such that when a surface moves by them each marker means places a new mark on the surface in response to the detection by its associated detecting means of a mark previously made by the marking means. The detecting and marking means in each set are displaced at different fixed distances from each other and means are provided to compare the accumulated counts in the detecting means to compensate for errors resulting from delays in the system.

---

This invention relates to the measurement of distances and more particularly it concerns a novel system for rapidly and accurately obtaining length measurements along various surfaces.

The present invention is particularly useful in various web processing industries wherein the length of a web or strip of material must be measured with precision while it is moving rapidly from one station to another. Prior techniques for obtaining such measurements have utilized wheels or rolls which contact the web and turn at a rate corresponding to web speed. Web lengths are then ascertained by noting the amount by which the wheel or roll has turned. A drawback of these techniques lies in the fact that they depend upon frictional contact with the web and are thus rendered inaccurate by any slippage which may occur betwen the web and the wheel.

The present invention obtains accurate and automatic measurements of rapidly moving webs by means of special innovations to a basic technique which would normally not be considered suitable for modern high speed processing industries. This basic technique involves the successive stepping off of distances as with a measuring element of known length. The number of such steps (provided they are immediately adjacent to each other), times the length of the measuring element will equal the distance being measured.

This successive stepping off is implemented in the present invention by means of surface marking means and surface mark detecting means spaced a known fixed distance apart. The marking and detecting means pass over the surface along the distance to be measured. During such movement the marking means places a mark on the surface, and when the movement equals the distance between the marking and detecting means, the detecting means will pass over the mark and will produce a mark detection signal. This signal is tallied and a further signal is sent ahead to the marking means which imposes another mark on the surface. Subsequently, this second mark is detected and a new mark imposed. This detecting and marking process continues until the distance is covered or until the tally indicates that the sum of the distances covered is equal to a desired total length.

The above technique is subject to certain errors. These errors are due to the length of time needed for signal processing. That is a finite time elapses between the instant a surface mark is detected and the instant a new mark is produced. During this time delay, the marking and detecting means continue to move over the surface. As a result, a detected mark, which occasions to imposition of a new mark, has moved away from the detecting means by the time the new mark is actually imposed on the surface. Thus, the new mark, while being displaced from the detecting means by the known distance between the detecting and marking means, is actually a greater distance than this from the previous mark. The amount of this discrepancy, or unmeasured gap, depends upon the speed of movement of the marking and detecting means over the surface and upon the time delay between mark detection and subsequent mark production. Either of these two factors, particularly the former, is subject to variations. Hence a problem arises as to how these gaps may be accounted for.

The present invention makes it possible to overcome the above described variable gap problem. This is achieved, according to the present invention by separately though simultaneously measuring along the surface with two sets of marking and detecting means. The distance between the marking and detecting means in each set is different, and the time delay between signal detection and subsequent signal imposition for each set is either the same, or at least is related in a known manner. As the measurements proceed, the marks produced by each set are compared for time of occurrence, and based upon this an indication of the cumulative effect of the error gaps can be obtained.

As illustratively embodied, the present invention makes use of two measuring elements, each having mounted thereon a surface marking device and a surface mark detecting device. The distance between these devices is fixed and is different for each measuring element. The measuring elements are arranged in conjunction with a moving web such that the web moves from the marking to the detecting devices. As the web moves, the marking devices mark the web and these marks travel toward their respective detecting device. Upon detecting a mark each detecting device records the mark and sends a signal to its respective marking device to make a new mark on the web. It is the duration between detection of a mark and the making of a subsequent mark, times the web speed that accounts for the gaps of unknown size which occur between each successive measurement.

The recorded marks from the detecting devices of the two measuring elements are counted. They are also compared to ascertain their relative sequence of occurrence; and a notation is made when this sequence changes. Depending upon the count which has been achieved at the time a change in sequence occurs, an indication can be obtained of the length of web which has been measured. The accuracy of this indication, moreover, will be substantially unaffected by the occurrence of gaps between successive measurements or marks along the web.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and are shown in the accompanying drawings, forming a part of the specification, wherein:

FIG. 1 is a diagrammatic side elevational view of a portion of a web processing apparatus arranged for making web length measurements according to the present invention;

FIG. 2 is an enlarged perspective view of the web length measurement region of the apparatus of FIG. 1.

FIG. 3 is a bottom plan view of the arrangement shown in FIG. 2.

FIGS. 4, 5 and 6 are graphical representations of mark arrangements useful in understanding the operation of the present invention; and FIG. 7 is a block diagram of the signal processing portion of the arrangement of FIG. 1.

In the system shown in FIG. 1, a strip web, or ribbon 10 of sheet steel is moved along in the direction of the arrow A past various rollers, etc, to a take-up roll 12 upon which it is wound. Various drive rolls 14 and guide rolls 16 are provided to control the movements of the strip 10 during its travel.

A cutter assembly 18, including upper and lower cutter blades 20 and 22, is provided along the path of travel of the strip 10; and operates in response to actuating signals to sever the strip 10 so that predetermined lengths thereof are wound onto the take-up roll 12. A secondary take-up roll support 24 is provided to support a new take-up roll (not shown) upon which a subsequent length of strip 10 can be wound while the first take-up roll 12 is being removed.

A length of cut measurement and control unit 26 is located upstream of the cutter assembly 18; and serves to provide accurate indications of the length of the strip 10 which has passed by since the last cut made by the cutter assembly 18. The output of the unit 26 can be used to control the further operation of the cutter assembly 18, so that a predetermined length of strip 10 will be wound onto the take-up roll 12.

The length of cut measurement and control unit 26 is shown more fully in FIGS. 2 and 3. As can be seen, there are provided two pairs of pinch rolls 28 and 30 located respectively at opposite ends of the unit 26. These rolls are driven and/or braked according to known techniques to maintain the strip 10 under slight tension as it passes between them. This serves to maintain the strip 10 in a taut flat condition during measurement, so that an accurate indication will be insured.

A pair of magnetic erase heads 32 and 34 are located at transversely displaced positions near the strip 10 toward the upstream pinch rolls 28. These heads are electrically energized in the usual manner of a conventional magnetic tape recorder erase head to neutralize any variations in the magnetic configurations along the strip 10.

Downstream from the first erase head 32, and in line therewith, there is provided a first magnetic record head 36, followed by a first magnetic pick-up head 38. Similarly, downstream from the second erase head 34, and in line therewith, there are provided second and third magnetic record heads 40 and 42, and a second magnetic pick-up head 44. These record and pick-up heads are also electrically energized in the manner of magnetic tape recorder record and pick-up heads; and they serve to impose and respond to, respectively, magnetic markings on the strip 10 as it moves along through the measurement and control unit 26. The electrical signals to and from the various erase, record and pick-up heads are processed in a signal processing unit 50 (FIG. 1).

The first and second record heads 36 and 40 are located upstream of their respective pick-up heads by distances B and C respectively, and the third record head 42 is located a distance D upstream from the second record head 40.

During operation of the system, the strip 10 moves along in the direction of the arrow A. During this movement the two erase heads 32 and 34 are in constant operation to clear two longitudinal paths (shown by phantom lines 35 and 37) along the strip from all magnetic variations or signal producing "marks." The first of these paths 35, passes under the first record head 36 and the first pick-up head 38, while the second path 37 passes under the third and second record heads 42 and 40, and the second pick-up head 44.

Considering first, the sequence of events along the first longitudinal path 35, the first record head 36 becomes energized instantaneously to produce a magnetic realignment or a first magnetic "mark" on the surface of the strip 10. Thereafter this mark passes by the first pick-up head 38. The first pick-up head then generates an electrical pulse which, as will be described more fully hereinafter, is tallied and processed and used to reenergize the first record head 36 so that a second magnetic mark is made on the strip 10.

Now if the first record head 36 were reenergized at precisely the same instant that the first pick-up head 38 sensed the first magnetic mark, then the two marks on the strip 10 would be displaced by the distance B. In such case a very accurate and reliable length indication could be obtained simply by tallying or counting the number of marks sensed by the first pick-up head 38 and multiplying this number by the distance (B), whereby $L=nB$. Here (L) equals the total measured length, and ($n$) equals the number of marks made on the strip 10.

It is not possible however, to obtain a length measurement in this manner, for a finite time delay ($t$) exists between the first instant when one mark is sensed and the second instant when a subsequent mark is imposed. During this finite time delay, the strip 10 continues to move, so that the actual distance between successive marks is not merely the value (B), but instead it is ($B+e$), where $e$ is an error or unmeasured gap caused by the time delay. Although the time delay ($t$) can be predicted to a certain extent, this alone will not suffice to compensate for the error ($e$), for this error is also dependent upon the strip velocity ($v$) which may vary considerably. Thus the strip length becomes $$L=nB+\sum_{0}^{n}(vt)$$

where $vt=e$.

The provision of the second pick-up head 44 and the second and third record heads 40 and 42 along the second longitudinal path 37 on the strip 10 serves to a great extent to eliminate, or at least to reduce to insignificance the error ($e$) caused by the time delay ($t$).

Considering now, the sequence of events along this second longitudinal path 37, the second and third record heads 40 and 42 are energized simultaneously to impose two magnetic marks on the strip which are displaced by a distance (D). Both these marks are sensed by the second pick-up head 44 and are processed in the signal processing unit 50. Thus the first mark is sensed when the strip 10 has moved a distance (C) and the second mark is sensed when the strip 10 has moved a distance ($C+D$). The signal processing unit 50 however, operates to reenergize the second and third record heads 40 and 42 only in response to alternate marks, i.e. those imposed by the third record head 42. As a result, an error ($e$) caused by the time delay ($t$) in the signal processing unit 50 will appear only once for the distance $C+D$. Thus the actual strip length for ($m$) marks in the second longitudinal path is $$L=m(C+D)+\sum_{0}^{m}(vt)$$

where $vt=e$

The time delay ($t$) produced by the signal processing unit 50 is the same for the pick-up and record heads in both longitudinal paths 35 and 37. Also since any variation in strip velocity affects both paths equally, the error ($e$)

can be considered to be the same for corresponding locations along each path.

As indicated previously, the provision of the second record head 40 in the second longitudinal path is not for the purpose of compensating for the error $(e)$, but instead it is to compensate for possible pulse skipping by one of the other pick-up or record heads. Thus in considering how the system operates to compensate the error $(e)$, the presence of the second record head 40 may be disregarded.

Now each measurement made along the first longitudinal path 35 represents strip movement over a distance $(B)+e$, and each measurement made along the second longitudinal path 37 represents strip movement over a distance $(C+D)+e$. As indicated above, the value $(e)$ in both cases is at least substantially the same, so that if $(B)$ were made to equal $(C+D)$ then the marks produced along each path on the strip 10 would correspond nearly exactly. However, if the distance $(B)$ were made smaller than the distance $(C+D)$ by, say a slight difference $(d)$, then, as shown in FIG. 4 the marks produced in the first path would begin to fall behind those produced in the second path, and this falling behind would be cumulative, increasing by the amount $(d)$ for each measurement. Eventually, when the cumulative number of $(d$'s$)$ equalled or exceeded the length of one full $(C+D)$ distance, then the marks would come into correlation or near correlation again. The occurrence of this can be seen, as shown in FIG. 4, by a change in the mark sequence pattern. That is, the marks occur alternately from one path to the other until such time as the cumulative $(d$'s$)$ make up the distance $(C+D)$. At this time two successive marks occur in the first path 35 between two successive marks in the second path 37, so that a break occurs in the alternation or sequence of mark occurrence from one path to the other.

The above described phenomena are used in the present invention to compensate for the unknown error $(e)$. This is done in the illustrative embodiment by making the distance $(B)$ equal precisely to one half the distance $(C+D)$, so that $2B=C+D$. Now since an error $(e)$ accompanies each measurement in each path, then two successive first path measurements can be represented by the distance $2B+2e$. Also, since $2B=C+D$, the distance $2B+2e$ can be represented as $(C+D+2e)$. At the same time a single second path measurement is represented as $(C+D+e)$; so that the total difference $(d)$ between two successive first path measurements and a single corresponding second path measurement is equal to $$(C+D+2e)-(C+D+e)=e$$

This is represented in FIG. 5. It will be noted that for each measurement made along the second path $(C+D+e)$, two measurements $2(B+e)$ have been made along the first path, leaving a difference of $(e)$. Also, even though the value $(e)$ may change along the strip 10 as a result of strip velocity changes, this will have negligible effect for the values of $(e)$ from corresponding measurements in each path and will be nearly identical since they are obtained at nearly the same time.

Now the value of $(e)$ itself at any point along the strip is unknown since the strip speed may change during measurement. However, it is known that each two first path measurements cover a distance along the strip 10 which exceeds the distance covered by a single second path measurement by a distance $(e)$. Because of this greater distance, the first path marks drop back along the strip 10 with respect to the second path marks. The amount of drop back is cumulative, increasing by an additional $(e)$ for each pair of first path measurements. Eventually this drop back attains a value equal to or in excess of the distance $(B)$. This is seen in FIG. 5 where the second mark in the second path is in advance of a corresponding mark in the first path by a slight distance $(e)$; but subsequent marks in the second path become further and further advanced from their respective corresponding first path marks as additional $(e)$ values are added to them. Thus these second path marks effectively sweep through the entire distance $(B)$, so that eventually a second path mark skips its corresponding first path mark and comes to correspond with a subsequent mark in the first path. This new correspondence can be seen as a change in the sequence of occurrence of the marks from one path to the next. That is, where normally two first path marks occur between successive second path marks, when a change in correspondence (and with it, a change in sequence) occurs, then, as can be seen, only one first path mark occurs between successive second path marks.

Now, assuming that the marks along each path begin in correlation with each other as illustrated on the left in FIG. 5; and that after $(m)$ second path measurements a new correlation was noticed, because of a change in sequence, at this point there would have occurred $(2m-1)$ first path marks. This is because two first path marks occur for each second path mark; and the sum of the accumulated errors along the first path would make up for, or slightly exceed, the additional B distance. The most by which the distance covered along the first path could exceed the distance covered along the second path when a change in sequence occurs would be $(e)$. This is because as pointed out above, the first path marks drop back by one additional amount $(e)$ from the first path marks for each first path measurement.

Stating the above mathematically, when a change of sequence occurs, then $$(2m-1)B + \sum_0^{2m-1} e \geq m(C+D) + \sum_0^m e$$

and $$2mB + \sum_0^{2m-1} e - B \geq 2mB + \sum_0^m e$$

and $$\sum_0^{2m-1} e - \sum_0^m e \geq B$$

Now since the corresponding values of $e$ along each path are nearly equal it can be said that $$\sum_0^m e = B + e$$

Thus no matter what $(e)$ happens to be or how it may change, when a change in correlation or sequence pattern occurs, then the total accumulated error along the first path is equal to $(B)$. In other words, the actual length of the strip 10 which has passed by the record and pick-up heads will exceed the indicated length by a distance $(B)$. Thus by counting the number of first path measurements which occur between sequence changes, and then adding one to this number, the resultant number multiplied by the distance $(B)$ will give the actual length of strip which has passed through the measuring apparatus.

As indicated above the maximum error which could occur, assuming no pulses were missed, would be the error distance $(e)$ for one measurement. This single measurement error is, however, effectively distributed over several successive measurements so that its effect is correspondingly diminished. As an example, where the distance B equals one half foot, and the distance $(C+D)$ equals one foot, and when an error $(e)$ of 0.2% (.001 feet per one half foot) would normally occur for each first path measurement, this would normally represent an error of some 30 feet over a 15,000 foot strip. However with the present invention, a maximum error of .001 feet would occur only after completion of a complete sequence of measurements, i.e., where $(2m-1)(e)=(B)$. In such case $(m)$ would equal 249, so that a possible error of only .001 feet would occur for each 249 one half foot measurements or for 124 measured feet. Thus where prior systems resulted in a possible error of 30 feet for each 15,000 feet of measured strip, the present invention reduces this to .06 feet for each 15,000 measured feet.

As stated previously the provision of the second record head 40 serves to reduce error in the event of a missed mark. This may occur either as a result of one of the record heads to function properly or as a result of one of the pick-up heads to function properly. The addition of the second record head 40 has the effect of adding extra magnetic marks along the second longitudinal path of the strip 10. Thus extra marks, as illustrated in FIG. 6 are spaced a distance D in advance of each mark made by the third record head 42. It will be noticed from the diagram of FIG. 6 that the presence of these additional marks does not affect the place of occurrence of sequence changes but that it does change the sequence from a two first path, one second path, pattern to a one first path, one second path pattern. Further when a change in sequence occurs, instead of one first path mark occurring between successive second pass marks, zero first path marks occur between successive second path marks. Such a sequence is more evenly arranged than the sequence shown in FIGS. 4 and 5; and is more easily adapted to implementation by means of logic arrangements hereinafter described.

Now without the presence of the additional marks provided by the second record head 40, there would be certain errors introduced by a missed mark along the second path. If, for example a missed mark were to occur in connection with a sequence change, i.e. on either side of and immediately adjacent a decreased number of successive marks along the first path, then the decrease would not be sensed and the system would not have observed a sequence change. Accordingly the system would fail to add an additional (B) distance to its output, so that the indicated strip length would be shorter than the actual strip length by the distance (B).

FIG. 7 shows in block diagram form the internal configuration of the signal control unit 50, and the manner in which the various record and pickup heads are connected into this configuration.

As shown in the drawing there is provided a start-stop transducer 52 which would, for example, be connected to the cutter assembly 18 (FIG. 1). As the blades 20 and 22 close to sever the strip 10, and form the leading edge of a given length to be cut, the transducer 52 produces a signal on a "start" line 54 to start operation of the signal control unit 50. Thereafter, when the cutter blades 20 and 22 close again to sever the strip and form the trailing edge of the given length, the transducer 52 again operates to produce a signal on a "stop" line 56 to terminate operation of the signal control unit 50.

The signal on the start line 54 passes through a start signal amplifier 58 and thence to a pair of record head OR circuits 60 and 62. The output of each OR circuit is passed through an associated record head amplifier 64 and 66; and from there to the first, second and third record heads 36, 40 and 42 as shown. This energizes the record heads so that they produce magnetic marks on the strip 10 at the locations of these heads. Thereafter, as the strip continues to move in the direction of the arrow A (FIG. 1), these marks move toward the first and second pickup heads 38 and 44. Upon sensing these marks the pickup heads produce electrical signals which are amplified in associated input amplifiers 68 and 70, and are shaped in associated shaping circuits 72 and 74. The output of the first shaping circuit 72 is supplied directly to the first record head OR circuit 60 to energize the first record head 36 so that it makes a new mark on the strip, at a distance (B) upstream from the pickup head 36. In a similar manner, the output of the second shaping circuit 74 is supplied directly to the second record head OR circuit 62 to energize the second and third record heads 40 and 42 simultaneously so that they make new marks on the strip 10 at distances (c) and (C+D) from the pickup head 44. In the case of the second and third record heads 40 and 42 however, since only a single energizing signal actuates both heads simultaneously to import two marks to the strip 10, only alternate detected marks are used to actuate these heads. To this end there is provided a binary or divider circuit 75 between the shaping circuit 74 and the second record head OR circuit 62. This binary or divider circuit operates in the usual manner to produce outputs only in response to alternate inputs. As will be appreciated, it is the finite duration required to detect a mark, to transfer the mark detecting to the record heads, and to energize the record heads, which results in the production of the error (e) in the system.

The basic measuring portion of the system and the error (e) reduction arrangement will now be described. As explained previously, the system measures lengths by counting the number of marks produced along the first longitudinal path 35 on the strip 10, i.e., the path which passes under the first record head 36 and the first pickup head 38. These marks are displaced along the strip by a distance (B+e) from each other. While the distance (e) is not known, and may in fact even vary during measurement, nevertheless as explained above, it can be ascertained by means of a sequence change, when the cumulative distance of the (e) in each measurement has equalled or exceeded the basic measurement distance B. Thus, by assigning to each mark the distance (B), and by counting the number of marks between sequence changes and then adding an extra count to this number, an accurate indication of measured length can be obtained. Since, in the present arrangement, there is utilized an extra record head along the second path, and the distances (B), (C) and (D) are equal, the same number of marks will occur in each path between sequence changes. Thus, in the arrangement of FIG. 7, the number of marks is counted along the second path. This is done by connecting the output of the second shaping circuit 74 to a counter OR circuit 76; and feeding the output of the OR circuit to a length counter 78.

As can be seen in the diagram of FIG. 6, a sequence change is manifested by the occurrence of two successive marks along the second path between two successive marks along the first path, in other words, by a missing mark along the first path. When this takes place, an extra count is fed to the counter 78, for as explained before, at this point, the sum of the accumulated errors (e) equals or slightly exceeds the distance (B).

The arrangement for detecting a missing first path mark comprises a first reset OR circuit 82, a first bistable switch circuit 84 and a first AND gate circuit 86. Diodes 88 and 90 are shown connected to the first and second inputs to the bistable circuit 84 to indicate that the output of the circuit will be switched to an ON state only by the trailing edge of a pulse supplied via the first diode 88, and the output will be switched to an OFF state only by the leading edge of a pulse supplied via the second diode 90.

Pulse signals from the shaping circuit 74 are supplied simultaneously to the first terminal (via the diode 88) of the first bistable switching circuit 84 and to one of the input terminals of the first AND gate circuit 86. Meanwhile pulse signals from the shaping circuit 72 are supplied through the first reset OR circuit 82, to the second terminal (via the diode 90) of the second bistable switching circuit 84. The output of the bistable switching circuit in turn is connected to the remaining input terminal of the first AND circuit 86. The output of the first AND circuit 86 is connected via the counter OR circuit 76 to the main length counter 78. It is also connected to a missing pulse counter 92.

The detection of a missing first path mark is accomplished in the following manner:

Each pulse from a second path mark is supplied to the AND gate circuit 86, but cannot pass through to the counters 78 and 92 while the bistable switching circuit 84 is in its OFF condition. This switching to an OFF condition is produced by the preceding first path mark pulse which is supplied from the shaping circuit 72 through the reset OR gate circuit 82 and the diode 90. When however two second path marks occur in succession, the pulse from the first will switch the output of the bistable circuit 84 to an ON condition, so that the output from the second will pass through the first AND gate circuit 86 to the counters 78 and 92.

The purpose for causing the bistable circuit 84 to be switched ON only by the trailing edge of second mark pulses and to be switched OFF only by the leading edge of first mark pulses is to prevent the production of a count at the beginning of a sequence, i.e., when a first path and a second path mark occur simultaneously.

As indicated above, it is advantageous to provide an indication of any skipped or missing marks which would cause two first path marks to be indicated between two successive second path marks. This is achieved by means of an arrangement which is symmetrical to the above described missing pulse detection arrangement. As shown, there is provided a second reset OR circuit 96, a second bistable switching circuit 98, and a second AND gate circuit 100. Diodes 102 and 104 are shown connected to the input terminals of the bistable circuit 98 to indicate that only the leading edge of a second path pulse will turn the circuit 98 to an OFF condition and only the trailing edge of a first path pulse will turn it to an ON condition. The circuit connections are similar to the above described missing pulse detection circuit except that in the present case, the output of the second path pulse shaping circuit 74 is connected through the reset OR gate 96 and the diode 102 to the bistable circuit 98, while the output of the first path pulse shaping circuit 72 is connected to both the second AND gate circuit 100 and to the diode 104 of the bistable switching circuit 98. The output of the second AND gate circuit 100 is supplied to a missing first path pulse counter 106, but of course, not to the main length counter 78. The operation of the circuit for detecting missing first path pulses is the same as that for detecting missing second detection arrangement and need not be repeated here.

Whenever a change in sequence occurs, either because of a skipped pulse or because of an accumulated error at least equal to the distance B, a new sequence is automatically initiated. To achieve this, there is provided a missing pulse OR circuit 108 to which signal outputs from the first and second AND gate circuits 86 and 100 are applied. Outputs from this OR circuit 108 are supplied to both the record head OR circuits 60 and 62 and through them to each of the record heads 36, 40 and 42 so that they become energized simultaneously to produce initially aligned marks on the surface of the strip 10. At the same time, the outputs from the missing pulse OR circuit 108 are supplied to both reset OR circuits 82 and 96 to switch the bistable circuits 84 and 98 to OFF condition for the initiation of a new sequence.

For obtaining outputs from the system, the main length counter 78 may be provided with a readout terminal 110 which is activated from the transducer stop line 56, thus to provide an output reading when a length of web has been severed. Conversely, means may be provided to actuate the transducer 52 to cause the web to be severed when the count in the counter 78 has reached a predetermined amount. In either event, there is provided a reset terminal 112 on the counter which is also energized from the stop line 56 to return the counter to zero count to begin a new measurement following the completion of a prior one. A delay circuit 114 is interposed ahead of the reset terminal to permit final readout prior to resetting the counter.

What is claimed as new and desired to be secured by Letters Patent is:

1. A method of making surface measurements comprising the steps of passing surface mark producing means and surface mark detecting means along said surface with the former means maintained at a fixed distance in advance of the latter means, and during such movement detecting with the latter means those marks imposed on the surface by the former means, and energizing said former means, to produce a new mark upon the detection of a previous mark, at the same time and in the same manner producing and detecting marks by means of further mark producing and mark detecting means maintained a different fixed distance from each other and counting the number of marks produced by one of said mark producing means between successive changes in the sequence pattern of marks produced by said two mark producing means.

2. A method as in claim 1 and including the step of adding to the distance represented by the counted marks, a distance equal to the shorter of said fixed distances.

3. A method as in claim 2 wherein said changes in sequence pattern are ascertained by counting the number of marks produced by one of said mark producing means between successive marks produced by the other mark producing means and signalling any change in this number.

4. A method as in claim 2 wherein the first fixed distance is maintained an integral multiple of the further fixed distance.

5. A method as in claim 1 wherein said changes in sequence pattern are ascertained by counting the number of marks produced by one of said mark producing means between successive marks produced by the other mark producing means and signalling any change in this number.

6. A method as in claim 1 wherein the first fixed distance is maintained an integral multiple of the further fixed distance.

7. A method as in claim 1 wherein the first fixed distance is maintained at twice said further fixed distance.

8. Apparatus for measuring distances along a surface, said apparatus comprising two sets of surface mark producing and detecting means maintained in close proximity to each other and means for causing said sets of surface mark producing and detecting means to undergo relative movement with respect to a surface along the direction of measurement along the surface, each of said surface mark producing and detecting means comprising a surface marking device and a surface mark detecting device mounted therebehind, whereby the marks produced upon said surface by the marking device in each set are detected by the mark detecting means of that set, means for energizing the marking device in each set in response to the detection of a mark by its associated detecting device to produce an additional surface mark, and means for counting the number of surface marks produced by one set which occur between changes in sequence pattern of marks produced by said two sets, said counting means including means for augmenting the count of said surface marks by a predetermined amount upon each sequence change.

9. Apparatus as in claim 8 wherein said means for causing relative movement between said two sets and said surface includes means for maintaining the speed of relative movement of each set with respect to said surface the same.

10. Apparatus as in claim 9 wherein each set includes signal processing means requiring the same duration between mark detection and responsive mark production.

11. Apparatus as in claim 8 wherein the distance between mark detection and responsive mark production. device is different from one set to the other.

12. Apparatus as in claim 11 wherein said means for counting includes means for detecting changes in the regular sequence of mark occurrence between said sets.

13. Apparatus as in claim 12 wherein said means for detecting changes includes means for noting the number of marks produced by one set between each successive mark produced by the other set and means for indicating any change in this number.

14. Apparatus as in claim 8 wherein said counting means includes means for adding to the counted marks an additional count upon each sequence change.

15. Apparatus as in claim 14 wherein the distance between the mark producing and detecting means in one set is different than the corresponding distance in the other set.

16. Apparatus as in claim 14 wherein the distance between the mark producing and mark detecting devices in one set is twice the distance between the mark producing and detecting devices in the other set.

17. Apparatus as in claim 16 wherein there is provided an additional mark producing device in said one set half way between the mark producing and detecting devices in the other set.

18. Apparatus as in claim 17 wherein there are provided means for simultaneously energizing both mark producing devices in said one set and for limiting such energization to occur in response to alternate marks detected by said detecting device.

19. Apparatus as in claim 8 wherein said means for counting includes a main counter and means connecting the detecting device of one set to said counter.

20. Apparatus as in claim 19 wherein said means for counting further includes means for adding an additional count to said counter upon occurrence of a change in sequence of marks produced by said two sets.

21. Apparatus as in claim 8 wherein said counting means includes means for detecting the occurrence of more than one mark from one of said sets between the occurrence of two successive marks from the other set.

22. Apparatus as in claim 8 wherein said means for causing said sets to undergo relative movement comprises strip guiding and driving means operable to move an elongated strip along a given path, and wherein said two sets of surface mark producing and detecting means are maintained in fixed position in said path near said strip.

23. Apparatus as in claim 8 wherein said mark producing and detecting devices are respectively magnetic record and pickup heads.

24. Apparatus for measuring distances along a surface said apparatus comprising a pair of mark detecting devices and a pair of associated mark producing devices positioned at different fixed distances in advance of said mark detecting devices in a common direction, means for producing relative movement between a surface to be measured and said devices along said common direction, signal processing means comprising means for energizing each mark producing device to make a mark on said surface in response to the detection of a previously made mark by its associated detecting device, means for counting the signals produced by one of said detecting devices and for indicating changes in sequence of mark occurrence as detected by said detecting devices.

References Cited
UNITED STATES PATENTS 2,989,690  6/1961  Cook _____ 324—34

RUDOLPH V. ROLINEC, Primary Examiner

ALFRED E. SMITH, Assistant Examiner

U.S. Cl. X.R.

33—125; 179—100.2; 235—92